Nov. 29, 1960 A. LINGG ET AL 2,961,921
DEVICES FOR MAKING COLORED PHOTOGRAPHIC REPRODUCTIONS
Filed March 21, 1957 2 Sheets-Sheet 2
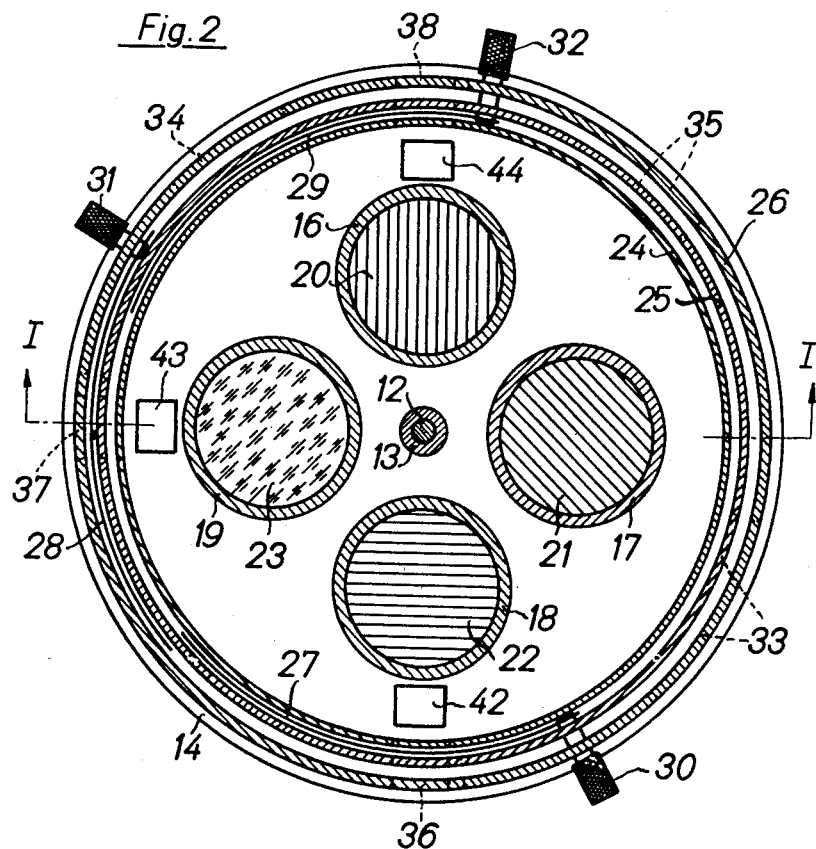
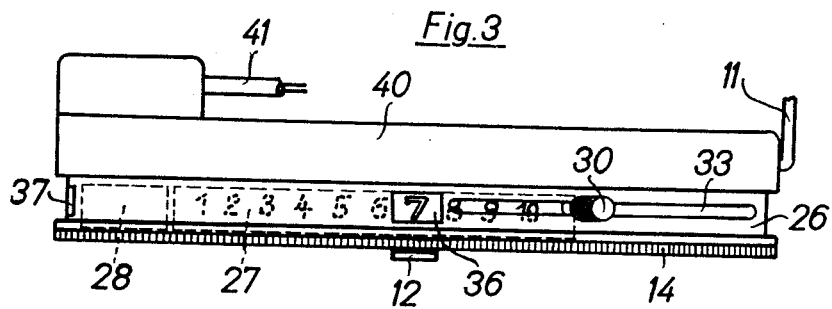
INVENTORS
Alfred LINGG, Friedrich BIEDERMANN, Richard WICK United States Patent Office 2,961,921
Patented Nov. 29, 1960

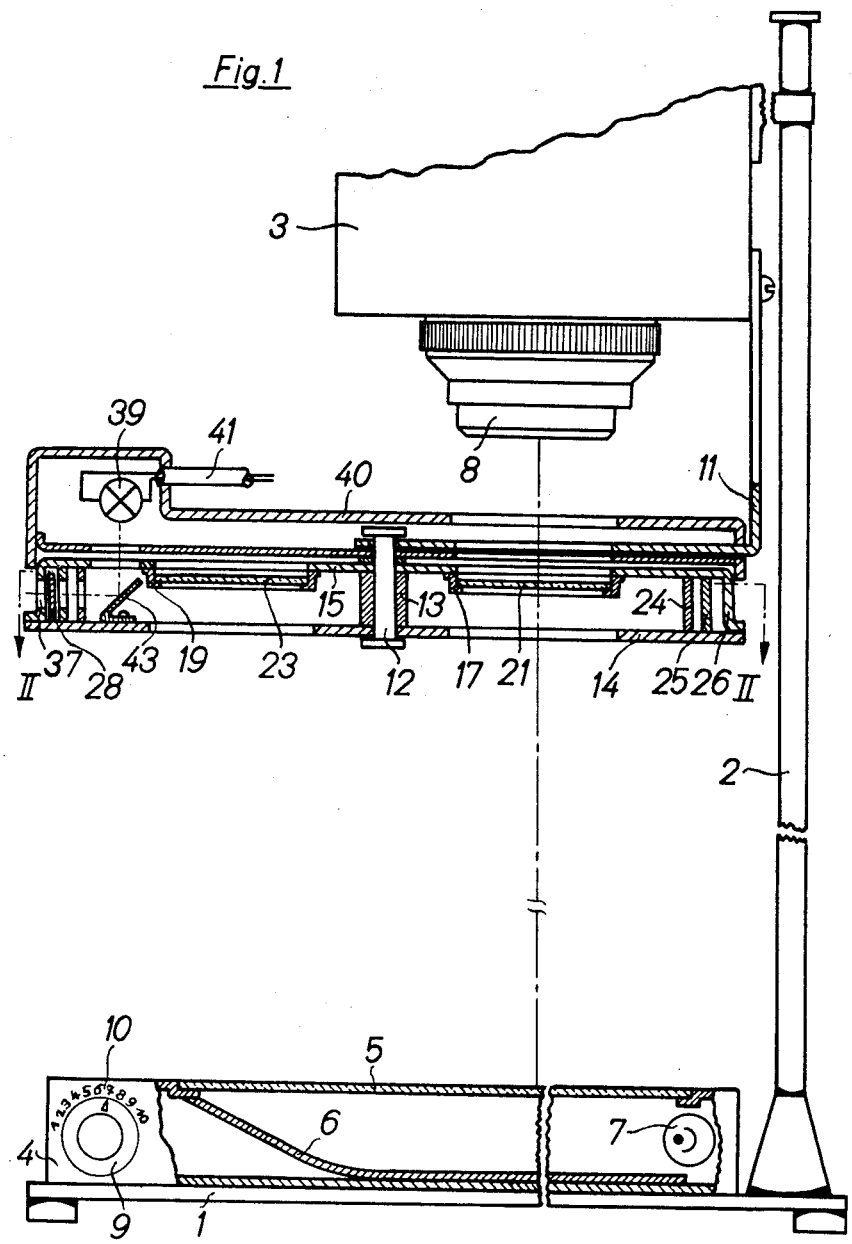

2,961,921

DEVICES FOR MAKING COLORED PHOTOGRAPHIC REPRODUCTIONS

Alfred Lingg, Munich-Grunwald, Friedrich Biedermann, Unterhaching, near Munich, and Richard Wick, Munich, Germany, assignors to Agfa Aktiengesellschaft, Leverkusen-Bayerwerk, Germany Filed Mar. 21, 1957, Ser. No. 647,566

Claims priority, application Germany Apr. 27, 1956

9 Claims. (Cl. 88—24)

The present invention relates to photographic devices. More particularly, the present invention relates to devices for making colored photographic reproductions.

Colored photographic reproductions are made by subjecting a light-sensitive copy sheet to a plurality of basic colors which are successively applied for different lengths of time to the sheet. For example, the exposeure of the light-sensitive sheet may take the form of three basic colors directed additively to the sheet and each partially exposing the latter, the different basic colors being applied in succession to the sheet.

The length of time during which such a sheet is exposed to light of the basic colors may be automatically regulated by a photoelectric switch device. Such a control device automatically interrupts the partial exposure of any given light of a particular basic color as soon as the amount of light of a particular color, which is predetermined, has fallen on the photoelectric cell of the control device.

If it is desired to make from a negative a copy of predetermined basic colors, for example, three basic colors of equal amounts in the copy, then the required amount of light of the several basic colors will not be in the same ratio to each other as in the finished copy, because the light-sensitive copy sheet has different sensitivities to the different spectral regions of the light of the different colors. In the event that an automatic photoelectric control device is provided for automatically terminating the exposure of the copy sheet to the several colors, then the spectral sensitivity of the photoelectric cell is in general different from that of the paper of the light-sensitive sheet on which the reproduction is being made. If the photoelectric cell receives light which passes through or is reflected from the copy paper, then account must be further taken of the fact that the properties of the copy paper which permit the spectral light to pass therethrough or to be reflected therefrom are also different for the different colors. For all of these reasons it is necessary that the amounts of light which reach the protoelectric cell and which respectively are of the different basic colors be of different relationships with respect to each other than the desired proportions of the basic colors in the final copy.

One of the objects of the present invention is to provide a structure taking the above factors into account and making it very easy to produce a reproduction having therein the several basic colors in desired amounts, respectively.

Another object of the present invention is to provide a device which makes it very easy for the operator to quickly know what settings to make in a device which automatically limits the extent of exposure to a plurality of different basic colors.

A further object of the present invention is to provide a photographic device of the above type which is capable of having parts such as scales thereof preset before the reproducing process is started and which after such presetting enables the process of making one or more reproductions to take place quickly and conveniently and with a maximum amount of accuracy.

An additional object of the present invention is to provide a device of the above type which enables a process for making reproductions to be carried on over long periods of time without any difficulties and with a structure which is extremely simple and inexpensive and highly reliable in operation.

With the above objects in view the present invention mainly consists of a device for making colored photographic reproductions, this device including a plurality of exposing means for respectively exposing a light sensitive copy sheet successively to a plurality of basic colors, and a plurality of adjustable scale means respectively connected operatively with the plurality of exposing means for indicating the extent to which the light-sensitive copy sheet is to be exposed to the plurality of exposing means, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly sectional, partly fragmentary, partly diagrammatic elevational view of one possible embodiment of a structure according to the present invention, the sectional portion of Fig. 1 being taken along line I—I of Fig. 2 in the direction of the arrows;

Fig. 2 is a sectional plan view of a color filter turret according to the present invention, the section of Fig. 2 being taken along line II—II of Fig. 1 in the direction of the arrows; and Fig. 3 is a side elevational view of the color filter turret, Fig. 3 showing scales of the invention as well as an illuminating means for the scales and a support for the illuminating means and turret.

Referring to the drawings, Fig. 1 shows an enlarger which includes the base 1 which carries the upwardly extending standard 2 on which the partially illustrated enlarger head 3 of conventional construction is vertically shiftable.

The base 1 carries a copy frame 4 in the form of a hollow housing, and this frame 4 includes an upper support means for the light-sensitive sheet which is to be exposed and on which the reproduction is to be made. This latter support means takes the form of a screen 5 through which light may pass and on which the light-sensitive sheet is placed. As is diagrammatically shown in Fig. 1, there is also located within the housing of the frame 4 a reflector 6 and a photoelectric cell 7 of a known exposure controlling device, the reflector 6 directing printing light passing through the screen 5 and the light-sensitive sheet lying upon said screen to the photoelectric cell 7. The exposure controlling device not shown in the drawings may be arranged within or out of the housing of the frame 4, and is adapted to automatically terminate the exposure of the light-sensitive sheet when a predetermined amount of printing light has reached the photoelectric cell. The termination of exposure may be effected preferably by switching off the printing light source. The article to be copied is carried in an unillustrated carrier of the enlarger head 3, and the objective 8, which is axially adjustable by a suitable helical thread, for example, forms an image of the article to be copied in the plane of the copy sheet on the screen 5. Said image may be observed on the screen 5 before the exposure of the light-sensitive sheet is made.

The copy frame 4 is furthermore provided with a turnable knob 9 carrying an index which is placed opposite one of the graduations of scale 10, this scale 10 being provided, for example, with the numerals 1–10. The knob 9 serves to adjust a calibrated potentiometer or another adjustable electrical element of the exposure controlling device for varying its sensitivity. In accordance with the setting of the knob 9 the source of light directed to the screen 5 is automatically terminated by the control device after a greater or smaller amount of light has reached the photoelectric cell. So it is possible to adjust the sensitivity of the controlling device in accordance with the sensitivity and the other characteristics of the light-sensitive sheet in view to printing light rays of the different colors.

As may be seen from Fig. 1, a bracket 11 is fixed to the enlarger head 3 so as to be shiftable with the latter, and this bracket 11 has a lower portion which carries a pin 12. The pin 12 extends along the axis of a hollow circular filter turret, the pin 12 turnably supporting the hollow housing of this turret for movement about the axis of the housing. The pin 12 extends through a sleeve 13 of the turret 14, the sleeve 13 being located between the top wall 15 of the turret 14 and the bottom wall thereof. The top wall 15 of the turret is formed with four openings 16–19 respectively distributed about the axis of the turret, as is apparent from Fig. 2, and in these openings several filters and a clear glass are supported. Thus, the openings 16–18 respectively have located therein the red filter 20, the green filter 21, and the blue filter 22, while the clear glass 23 is carried by the top wall 15 at its opening 19. As may be seen from Fig. 1, the pin 12 extends parallel to the optical axis of the objective 8, and the distance of the pin 12 from this optical axis is such that the several color filters as well as the glass 23 may be successively located in the position of the filter 21 shown in Fig. 1 where these filters respectively extend across the optical axis. The clear glass disc 23 is located on the optical axis when selecting the part of the picture which is to be copied.

It will be noted that the bottom wall of the turret housing 14 is formed with a plurality of openings respectively aligned with the openings 16–19 so that the light passing through the discs 20–23 will also pass through the bottom wall of the housing, as is apparent from Fig. 1.

Thus, it will be seen that the device of the invention provides a plurality of exposing means for respectively exposing a light sensitive copy sheet successively to a plurality of basic colors. A plurality of adjustable scale means are respectively connected operatively with this plurality of exposing means for indicating the extent to which the light-sensitive copy sheet is to be exposed to the several exposing means, respectively, and these scales will now be described. It will be noted from Figs. 1 and 2 that the housing 14 includes an outer annular wall 26 which interconnects the top and bottom walls of the housing. Within this annular side wall 26 is located an inner circular wall 24, and between the walls 24 and 26 there is an intermediate circular wall 25, the walls 24—26 being coaxial. In the illustrated example three scales 27–29 are arranged in the spaces between the walls 24—26. Thus, as is most clearly shown in Fig. 2, the scales 27 and 29 are located in the space between the walls 24 and 25, while the scale 28 is located in the space between the walls 25 and 26. Each of the scales 27–29 is arcuate and extends along a circle which is coaxial with the outer wall 26 of the housing 14. The scales 27–29 each is provided with graduations corresponding to those of the scale 10. Thus, each of the scales 27–29 is provided with a series of graduations 1–10. Furthermore, the scales 27–29 are preferably made of a transparent material, and the walls 24—26 serve to guide the several scales 27–29 for movement along circular paths which are coaxial with the wall 26. The several scales 27–29 are manually shifted through the medium of pins 30–32 respectively fixed to the scales 27–29 and extending to the exterior of the turret housing so as to be accessible to the operator. Each of the pins 30–32 has an outer knurled part which is grasped by the operator, and the inner end of each of these pins is connected to an opening of the scale to which it is connected. Thus, the inner end of the pin 30 is threadedly connected to the right end of the scale 27, as is viewed in Fig. 2, and the walls 25 and 26 are respectively formed with a pair of aligned elongated slots 33 through which the pin 30 extends. Furthermore, just to the left of the slots 33, as viewed in Figs. 2 and 3, the walls 25 and 26 are formed with a pair of aligned openings 36 through which the graduations of the scale 27 are successively visible during shifting of the scale. In the same way the walls 25 and 26 are formed with a pair of aligned elongated slots 35 through which the pin 32 extends so as to be connected to the scale 29, and the operator can of course shift the pin 32 along the slots 35 so as to shift the scale 29, the calibrations on the scale 29 being successively visible through a pair of aligned openings 38 respectively formed in the outer side wall 26 and in the intermediate wall 25. The pin 31 extends through a slot 34 of the outer wall 26 so as to be connected to the scale 28 and the numbers of the scale 28 are successively visible through the opening 37 in the outer wall 26. It should be noted that the openings 36–38 of the outer wall 26 are respectively located in front of aligned openings of the intermediate and inner walls 25 and 24. A plurality of reflectors 42–44 are respectively carried within the housing 14 on the bottom wall thereof respectively behind the openings 36–38, and as is apparent from Fig. 1, the top wall 15 of the housing is formed with three openings respectively located over the reflectors 42–44 so that light from a light source 39 will move down through the openings of the top wall and will be directed by the reflectors 42–44 respectively through the scales 27–29 so as to illuminate the latter to make them easily readable through the openings 36–38 respectively.

The light source 39 forms part of an illuminating means which includes the rigid housing 40 carried by the bracket 11 as well as the leads 41 leading from the light source 39 to any suitable conventional source of current. It will be noted that the housing 40 is formed with aligned openings through which the light passes from the objective 8 downwardly through the openings of the turret housing 14.

The several scales 27–29 are respectively associated with the several color filters 20–22, and the arrangement is such that the scale of a particular color filter is located at a diametrically opposed part of the turret housing. Thus, as may be seen from Fig. 2, the scale 27 which cooperates with the filter 20 is located directly opposite the latter on the opposite side of the housing, while the scale 28 which cooperates with the filter 21 is also located diametrically opposite the latter, and the scale 29 which cooperates with the filter 22 is located diametrically opposite the latter.

The above described structure operates as follows:

Before the actual process of making reproductions is carried out, a particular copy paper which is to be used for the reproductions is tested so as to determine the proper settings of the knob 9 for the different basic colors which are to be applied to the paper. If a color negative is to be copied, then after a choice of a suitable light-sensitive copy paper, and after the properties of the latter have been determined, the several pins 30–32 are manually shifted so as to place in the windows 36–38 the numbers which are to be set on the scale 10 with the knob 9 for the several different color filters, respectively. When each of the scales 27–29 is brought into its adjusted position, the pins 30–32 connected thereto are turned into the threaded openings of the scales so as to fix the latter in their adjusted positions.

Assuming that the red filter 20 is now placed in the operating position along the optical axis, then when this filter 20 is on the optical axis the light from the bulb or the like 39 will be reflected by the reflector 42 through the scale 27 and the opening 36, so that the operator will see from the scale 27 which number to set the dial 9 at.

After the light sensitive sheet is placed on the screen 5 and the dial 9 is set according to number appearing in the window 36, the red light is applied to the copy sheet and the automatic control device stops the exposure to the red light after the predetermined length of time required. After the desired amount of red light has thus been applied to the copy sheet and automatically terminated, the operator turns the turret 14 so as to locate the green filter 21 on the optical axis, and at this time, as may be seen from Fig. 1 the light from the light source 39 will be reflected by the reflector 43 through the scale 28 and the window 37 so that the operator can see from the window 37 which number on the scale 10 to set the knob 9 at, and after this setting is made the exposure to green light is made and is automatically terminated after the proper length of time. The same steps are then repeated for the blue light.

Since usually a series of reproductions are made with the same type of copy paper, the settings of the scales 27–29 can be maintained for a relatively long period of time so that during the operation of making a series of reproductions the three successive positions of the knob 9 become well known to the operator who may then devote his entire attention to parts of the apparatus other than the above-described structure.

Instead of arranging the filter turret between the objective and the plane of the copy sheet, this color filter turret can also be arranged along the optical axis between the light source and the negative plane. Furthermore, the structure of the invention is useful not only with optical reproducing structures, but also with contact copying devices.

Furthermore, instead of providing a rotary motion for the several color filters 20–22, they may be arranged on supports which are linearly shiftable or which are turnable through only part of a circle, for example, and of course the scales 27–29 would then be arranged for movement with their respective color filters 20–22.

If the above-described structure is used with a device which does not include a means for automatically regulating the exposure time of the several colors, then the several scales 27–29 may simply indicate the relative exposure times for the several color filters 20–22, and with the graduations on such scales the time of exposure to the basic colors may be determined for a particular light-sensitive copy sheet while easily taking into account the spectral sensitivity thereof to the different spectral ranges of the different colors.

It will be understood that each of the elements described above, or two or more together, may also find a useful application in other types of photographic devices differing from the types described above.

While the invention has been illustrated and described as embodied in a device for reproducing colored reproductions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for making photographic color prints on light-sensitive material, in combination, light-directing means for directing light along a predetermined axis to the light-sensitive material for exposing the latter; a plurality of different color filters; means supporting said filters for respective movement successively into an operating position extending across said predetermined axis for exposing said light-sensitive material to the colors provided by said filters, respectively; manually adjustable means for regulating the time of each exposure of said light-sensitive material through each of said filters, said manually adjustable means including a scale for indicating the setting of said manually adjustable means; a plurality of adjustable scale means, each associated with one of the color filters and each having graduation scales corresponding to said scale of said manually adjustable means; and selecting means operatively connected to said graduated scales, respectively, for selectively adjusting said adjustable scale means so that only one of the graduations thereof is visible, said scale means being operatively connected to said supporting means for successively transferring said scale means into an observing position when the color filters with which said scale means are respectively associated, are moved into the operating position thereof, whereby said scale means may be respectively set to indicate in the observing position thereof the necessary setting of said manually adjustable means for the proper exposure of said light-sensitive material through the respective color filter.

2. In a device for making photographic color prints on light-sensitive material, in combination, light-directing means for directing light along a predetermined axis to the light-sensitive material for exposing the latter; a plurality of different color filters; means supporting said filters for respective movement successively into an operating position extending across said predetermined axis for exposing said light-sensitive material to the colors provided by said filters, respectively; manually adjustable means for regulating the time of each exposure of said light sensitive material through each of said filters, said manually adjustable means including a scale for indicating the setting of said manually adjustable means, said scale indicating the values to which the manually adjustable means is to be adjusted before exposure of the light-sensitive material to light through each of said filters; a plurality of adjustable scale means, each associated with one of the color filters and each having graduation scales corresponding to said scale of said manually adjustable means; and selecting means operatively connected to said graduated scales, respectively, for selectively adjusting said adjustable scale means so that only one of the graduations thereof is visible, said scale means being operatively connected to said supporting means for successively transferring said scale means into an observing position when the color filters with which said scale means are respectively associated, are moved into the operating position thereof, whereby said scale means may be respectively set to indicate in the observing position thereof the necessary setting of said manually adjustable means for the proper exposure of said light-sensitive material through the respective color filter.

3. In a device for making photographic color prints on light-sensitive material, in combination, light-directing means for directing light along a predetermined axis to the light-sensitive material for exposing the latter; a rotatable turret having a turning axis parallel to said predetermined axis and located to one side thereof; a plurality of different color filters mounted on said turret so as to be successively movable into operating positions extending across said predetermined axis upon turning of said turret so that said light-sensitive material may be exposed to the color provided by the respective filter; manually adjustable means for regulating the time of each exposure of said light-sensitive material through each of said filters, said manually adjustable means including a scale for indicating the setting of said manually adjustable means; a plurality of adjustable scale means, each associated with one of the color filters and each having graduation scales corresponding to said scale of said manually adjustable means; and selecting means operatively connected to said graduated scales, respectively, for selectively adjusting said adjustable scale means so that only one of the graduations thereof is visible, said scale means being operatively connected to said supporting means for successively transferring said scale means into an observing position when the color filters with which said scale means are respectively associated, are moved into the operating position thereof, whereby said scale means may be respectively set to indicate in the observing position thereof the necessary setting of said manually adjustable means for the proper exposure of said light-sensitive material through the respective color filter.

4. In a device for making photographic color prints on light-sensitive material, in combination, light-directing means for directing light along a predetermined axis to the light-sensitive material for exposing the latter; a rotatable turret having a turning axis parallel to said predetermined axis and located to one side thereof; a plurality of different color filters mounted on said turret so as to be successively movable into operating positions extending across said predetermined axis upon turning of said turret so that said light-sensitive material may be exposed to the color provided by the respective filter; manually adjustable means for regulating the time of each exposure of said light-sensitive material through each of said filters, said manually adjustable means including a scale for indicating the setting of said manually adjustable means; a plurality of adjustable scale means, each associated with one of the color filters and each having graduation scales corresponding to said scale of said manually adjustable means; and selecting means operatively connected to said graduated scales, respectively, for selectively adjusting said adjustable scale means so that only one of the graduations thereof is visible, said scale means being mounted on said turret so as to be transferred into an observing position when the color filters with which said scale means are respectively associated, are moved into the operating position thereof, whereby said scale means may be respectively set to indicate in the observing position thereof the necessary setting of said manually adjustable means for the proper exposure of said light-sensitive material through the respective color filter.

5. In a device for making photographic color prints on light-sensitive material, in combination, a base; support means carried by said base for supporting the light-sensitive material; a standard extending upwardly from said base; an enlarger head shiftable along said standard toward and away from said support means; an objective carried by said enlarger head for directing light rays along the optical axis of said objective to said support means; a bracket fixed to said enlarger head and having a lower portion located at a lower elevation than said objective; a pin carried by said lower portion of said bracket; a rotatable turret turnably mounted on said pin; a plurality of different color filters mounted on said turret so as to be successively movable into operating positions extending across said optical axis upon turning of said turret so that said light-sensitive material may be exposed to the color provided by the respective filter; manually adjustable means for regulating the time of each exposure of said light-sensitive material through each of said filters, said manually adjustable means including a scale for indicating the setting of said manually adjustable means; a plurality of adjustable scale means each associated with one of the color filters and each having graduation scales corresponding to said scale of said manually adjustable means; and selecting means operatively connected to said graduated scales, respectively, for selectively adjusting said adjustable scale means so that only one of the graduations thereof is visible, said scale means being mounted on said turret so as to be transferred into an observing position when the color filters with which said scale means are respectively associated, are moved into the operating position thereof, whereby said scale means may be respectively set to indicate in the observing position thereof the necessary setting of said manually adjustable means for the proper exposure of said light-sensitive material through the respective color filter.

6. In a device for making photographic color prints on light-sensitive material, in combination, a base; support means carried by said base for supporting the light-sensitive material; a standard extending upwardly from said base; an enlarger head shiftable along said standard toward and away from said support means; an objective carried by said enlarger head for directing light rays along the optical axis of said objective to said support means; a bracket fixed to said enlarger head and having a lower portion located at a lower elevation than said objective; a pin carried by said lower portion of said bracket; a rotatable turret turnably mounted on said pin; a plurality of different color filters mounted on said turret so as to be successively movable into operating positions extending across said optical axis upon turning of said turret so that said light-sensitive material may be exposed to the color provided by the respective filter; manually adjustable means for regulating the time of each exposure of said light-sensitive material through each of said filters, said manually adjustable means including a scale for indicating the setting of said manually adjustable means; a plurality of adjustable scale means each associated with one of the color filters and each having graduation scales corresponding to said scale of said manually adjustable means; selecting means operatively connected to said graduated scales, respectively, for selectively adjusting said adjustable scale means so that only one of the graduations thereof is visible, said scale means being mounted on said turret so as to be transferred into an observing position when the color filters with which said scale means are respectively associated, are moved into the operating position thereof; and illuminating means carried by said bracket for illuminating each scale when the filter corresponding thereto is in said operating position thereof, whereby said scale means may be respectively set to indicate in the observing position thereof the necessary setting of said manually adjustable means for the proper exposure of said light-sensitive material through the respective color filter.

7. For use in a photographic enlarger for making colored reproductions, in combination, a hollow turret housing having top and bottom walls extending spaced and substantially parallel to each other and an annular wall interconnecting said top and bottom walls, said top wall being formed with a plurality of openings distributed about the axis of said housing and said bottom wall being formed with a plurality of openings aligned with the openings of the top wall respectively, said side wall being formed with a plurality of openings distributed about the axis of said housing and being equal to the number of openings in said top wall, and said top wall being formed with a plurality of apertures; a plurality of reflectors located in said housing respectively beneath said apertures of said top wall and respectively located behind said side wall openings for directing light passing downwardly through said apertures respectively through said side wall openings; a plurality of color filters respectively carried by one of said parallel walls at said openings thereof; a plurality of arcuate scales respectively extending along arcs of circles whose axes coincide with that of said housing, said arcuate scales being respectively located behind said openings of said side walls so as to be respectively visible therethrough, said scales being made of material through which light can pass so that when light is directed downwardly through said apertures of said top walls, said scales will be illuminated and graduations thereof will respectively be visible at said side wall openings, said scales corresponding respectively with said color filters; and manually engageable means operatively connected with said scales, respectively, for shifting the latter about the axis of said housing so as to locate predetermined graduations of said scales respectively behind said openings of said side wall.

8. In a device for making photographic color prints on light sensitive material, in combination, light directing means for directing light along a predetermined axis to the light sensitive material for exposing the latter; a plurality of different color filters; supporting means support-said filters for respective movement successively into an operating position extending across said predetermined axis for exposing said light sensitive material to the colors provided by said filters, respectively; manually adjustable means for regulating the time of each exposure of said light sensitive material through each of said filters; said manually adjustable means including a scale for indicating the setting of said manually adjustable means; indicating means associated with said filters; a plurality of adjustable scale means, each associated with one of said filters and each having graduation scales corresponding to said scale of said manually adjustable means; and a plurality of selecting means respectively operatively connected to said graduated scales for selectively adjusting said adjustable scale means so that only one of the graduations thereof will be aligned with said indicating means when the color filters with which said scale means are respectively associated are moved into the operating position thereof, whereby said scale means may be respectively set to indicate in the observing position thereof the necessary setting of said manually adjustable means for the proper exposure of the light sensitive material through the respective color filter.

9. In a device for making photographic color prints on light sensitive material, in combination, light directing means for directing light along a predetermined axis to the light sensitive material for exposing the latter; a plurality of different color filters; supporting means supporting said filters for respective movement successively into an operating position extending across said predetermined axis for exposing said light sensitive material to the colors provided by said filters, respectively; manually adjustable means for regulating the time of each exposure of said light sensitive material through each of said filters, said manually adjustable means including a scale for indicating the setting of said manually adjustable means; a plurality of adjustable scale means, each associated with one of said filters and each having graduation scales corresponding to said scale of said manually adjustable means; and means associated with each of said scale means for selectively adjusting the positions thereof and for bringing one of the graduations thereof into an observing position when the color filter associated with the respective scale means is brought into the operating position thereof, whereby said scale means may be respectively set to indicate in the observing position thereof the necessary setting of said manually adjustable means for the proper exposure of the light sensitive material through the respective color filter.

References Cited in the file of this patent

UNITED STATES PATENTS

| | | |
|---|---|---|
| 795,470 | Anger | July 25, 1905 |
| 2,420,379 | Mills | May 13, 1947 |
| 2,438,303 | Simmon | Mar. 23, 1948 |
| 2,518,947 | Simmon | Aug. 15, 1950 |
| 2,552,893 | Hillman et al. | May 15, 1951 |
| 2,627,207 | Bell | Feb. 3, 1953 |
| 2,684,611 | Hiden | July 27, 1954 |

FOREIGN PATENTS

| | | |
|---|---|---|
| 743,804 | Germany | Jan. 3, 1944 |